May 10, 1966  R. D. BARRIBALL  3,250,952
BALLAST APPARATUS FOR STARTING AND OPERATING A PAIR OF
FLUORESCENT LAMPS
Filed April 9, 1962  4 Sheets-Sheet 1
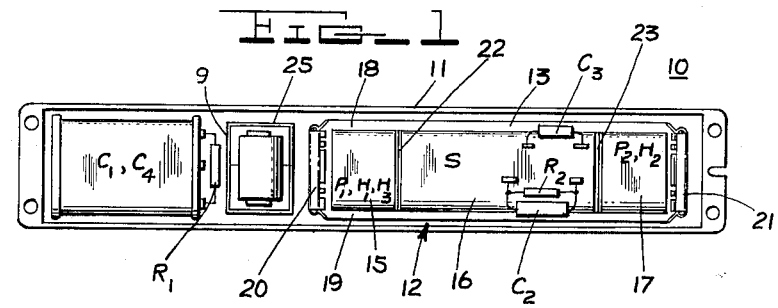
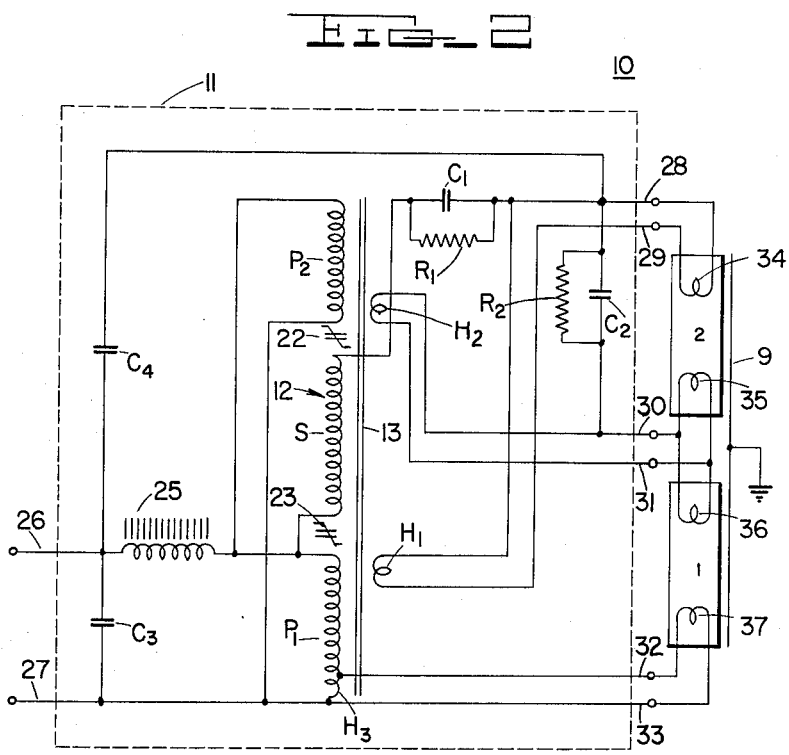
INVENTOR.
Richard D. Barriball,
BY Henry J. Marunich
Attorney.

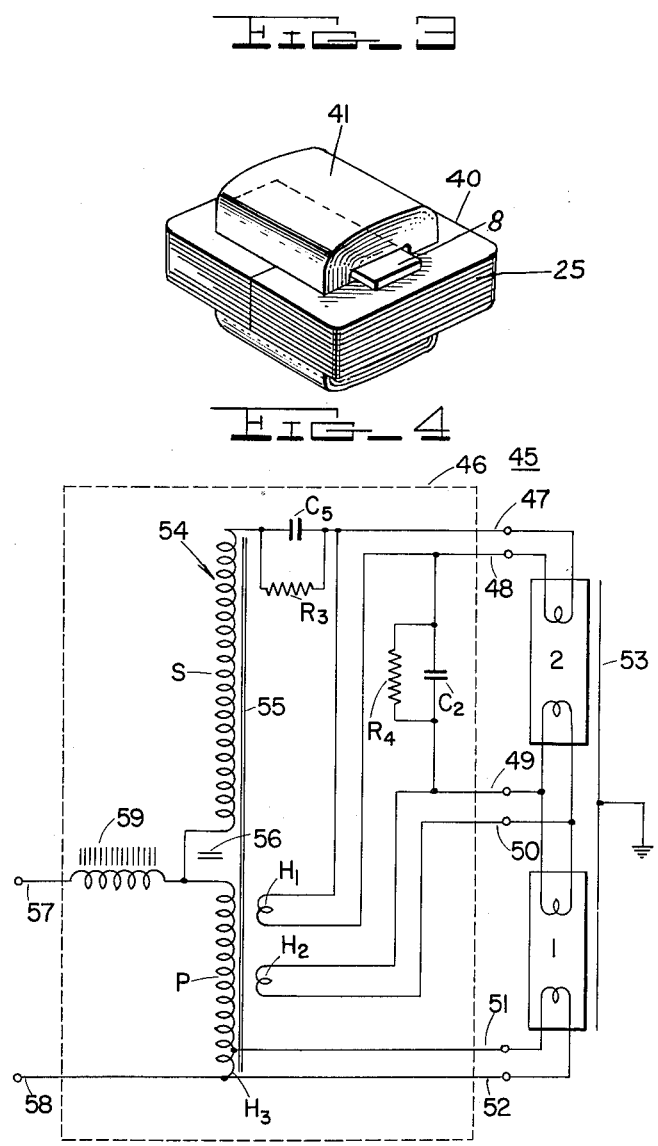

May 10, 1966 R. D. BARRIBALL 3,250,952
BALLAST APPARATUS FOR STARTING AND OPERATING A PAIR OF
FLUORESCENT LAMPS
Filed April 9, 1962 4 Sheets-Sheet 3

INVENTOR.
Richard D. Barriball,
BY Henry J. Marcinick
Attorney.

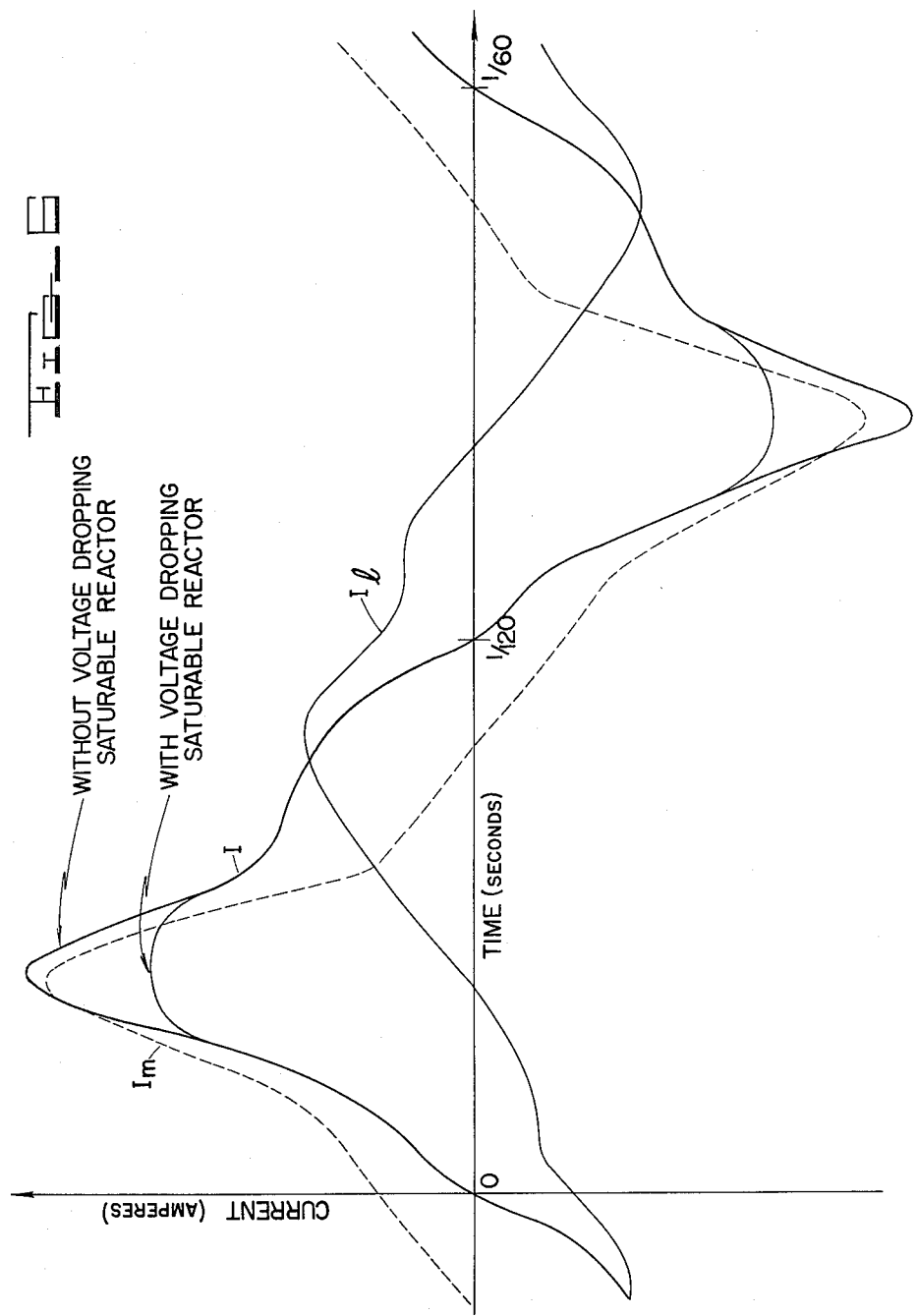

United States Patent Office 3,250,952
Patented May 10, 1966

3,250,952
BALLAST APPARATUS FOR STARTING AND OPERATING A PAIR OF FLUORESCENT LAMPS
Richard D. Barriball, Danville, Ill., assignor to General Electric Company, a corporation of New York
Filed Apr. 9, 1962, Ser. No. 186,130
11 Claims. (Cl. 315—187)

This invention relates to ballast apparatus for starting and operating one or more gaseous discharge lamps. More particularly, it relates to such ballast apparatus capable of supplying a current having an improved wave shape to one or more gaseous discharge lamps such as fluorescent lamps.

Since a transformer is generally employed to perform the voltage transforming and current limiting functions of the ballast apparatus, the heat losses of the ballast apparatus are essentially the losses in the transformer and these losses are a function of the root mean square or effective value of the secondary current of the transformer. The light output of fluorescent lamps operated by the ballast apparatus is a function of the average value of the current supplied to the lamps. Thus, the waveform of the current supplied to fluorescent lamps is an important factor in the design of a ballast apparatus.

As the waveform of the current supplied by the ballast apparatus more nearly approaches a square wave shape, the operational lamp power factor approaches unity. It will be appreciated that as the operational lamp power factor approaches unity for a predetermined light output, the power or volt-amperes that must be supplied by the ballast apparatus to operate the lamps at the predetermined light output will be less. A reduction in the power or volt-ampere requirements of the ballast apparatus will result in a lower value of the secondary current in the ballast transformer. Consequently, the heat losses in the ballast transformer are reduced. To obtain maximum light output from fluorescent lamps with minimum heat losses in the ballast transformer, from an ideal standpoint the ballast apparatus should supply a current having a waveform that is substantially square.

In a conventional ballast apparatus for starting and operating a pair of fluorescent lamps in a series lead circuit arrangement, the waveform of the current supplied to the lamp has a pronounced peak. This peaked wave shape indicates that the lamps are being operated at a relatively low lamp power factor. Accordingly, there is a definite need for an improvement in the wave shape of the current supplied by a conventional ballast apparatus.

Various arrangements have been employed in the past for improving the wave shape of the lamp current. An arrangement for improving the wave shape by varying the leakage reactance by the use of nonlinear magnetic shunts to provide a relatively increased value of leakage reactance in the early portion of each half cycle and a lesser value in the latter portion of each half cycle of lamp current is described and claimed in U.S. Patent No. 3,010,050 granted to Hume et al. In U.S. Patent No. 2,869,037 granted to Brooks et al., an arrangement for improving lamp current wave shape by controlling leakage reactance is disclosed wherein two bridged gaps are employed in the center winding leg of the ballast transformer to provide a distributed reluctance in the path of the secondary leakage flux.

Another arrangement for improving lamp current wave shape is described and claimed in a patent application filed concurrently with the present application in the name of Roger E. Hume, Patent No. 3,225,255 and assigned to the same assignee as the present invention. In this latter arrangement, an improvement in the ballast performance is achieved by providing a controlled discharge of a shunting capacitor in conjunction with reduced leakage reactance. Although all of the aforementioned arrangements for improving ballast performance have been eminently satisfactory, the lamp current wave shape is still generally characterized by a pronounced peak which occurs during the middle portion of each half cycle.

Accordingly, a general object of the present invention is to provide a ballast apparatus wherein the current supplied by the apparatus for starting and operating one or more gaseous discharge type of lamps is characterized by an improved wave shape.

A further object of the present invention is to provide a ballast apparatus wherein the voltage and current supplied by the apparatus for starting and operating one or more gaseous discharge type of lamps results in an improved lamp power factor.

It is still another object of the present invention to provide an improved ballast apparatus whereby the waveform of the current supplied by the apparatus to one or more fluorescent lamps is depeaked.

Still another object of the invention is to provide an improved ballast apparatus that will provide a lamp current waveform that is more nearly square.

These and other objects and advantages of one form of my invention are achieved in an improved ballast apparatus for starting and operating at least one gaseous discharge lamp, such as a fluorescent lamp. The ballast apparatus includes a ballast transformer having at least one primary winding and at least one secondary winding inductively coupled therewith on a magnetic core. In addition, a plurality of electrical leads are provided for supplying the output current of the ballast apparatus to the discharge lamp or lamps connected in circuit therewith. In accordance with the invention, I have provided a voltage dropping element such as a saturable reactor connected in circuit with the primary winding of the ballast transformer. The voltage dropping element has a predetermined impedance sufficient in magnitude to cause the rate of change of the magnetizing current of the ballast transformers to decrease as the magnetizing current approaches its maximum value in each half cycle, thereby preventing a substantially peaked wave shape from occurring in each half cycle of the waveform of the output current. Preferably, a series capacitor is connected in the secondary circuit of the ballast transformer to provide a net capacitive reactance therein.

In another aspect of my invention, the voltage dropping element may be used in conjunction with a shunting capacitor connected in parallel circuit relation with the secondary winding of the ballast transfermer. The shunting capacitor and the secondary winding are tuned to provide an oscillatory voltage in the early portion of each half cycle of the lamp current. With such an arrangement it is possible to realize the advantages of the present invention in a ballast apparatus having a tuned secondary circuit.

The subject matter which I regard as my invention is set forth in the appended claims. The invention itself, however, together with further objects and advantages may be understood by referring to the following description taken in connection with the accompanying drawings in which:

FIGURE 1 is a plan view of an unpotted ballast apparatus with the ballast case coverplate removed to show the physical arrangement of the components;

FIGURE 2 is a schematic circuit diagram of a ballast apparatus in accordance with the invention for starting and operating a pair of fluorescent lamps;

FIGURE 3 is a perspective view of the saturable reactor used in the embodiment of the invention illustrated in FIGURE 2;

FIGURE 4 shows a schematic circuit diagram of the ballast apparatus illustrating another form of my invention;

FIGURE 6 illustrates the waveforms of the lamp current I, the magnetizing current $I_m$ and the leakage reactance current $I_l$ corresponding to the equivalent circuit shown in FIGURE 5;

Figure 7:
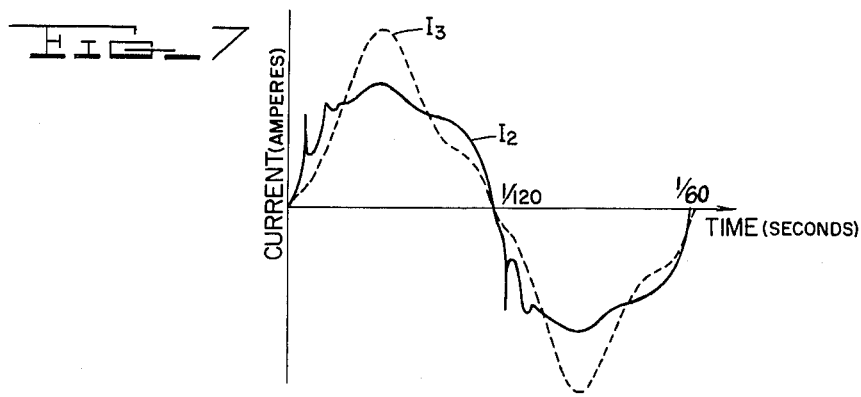
Figure 8:
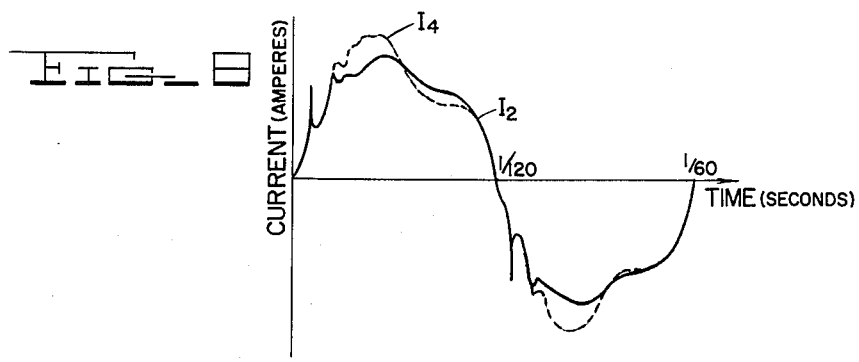

FIGURE 7 illustrates a waveform of the output current $I_2$ of the ballast apparatus shown schematically in FIGURE 2 superposed on the waveform of the output current $I_3$ of a comparable ballast of the prior art; and FIGURE 8 illustrates the waveform of the output current $I_2$ of the ballast apparatus shown in FIGURE 2 superposed on the waveform of the output current $I_4$ of the ballast apparatus shown in FIGURE 2 wherein the voltage dropping arrangement of the invention has not been employed.

Referring now to FIGURE 1, I have illustrated therein a ballast apparatus 10 with a portion of the ballast case 11 cut away to show the physical arrangement of the various ballast components before the ballast case 11 is filled with a potting compound. In the interest of clarity I have omitted the electrical connections. The electrical connections are shown in the schematic circuit diagram of FIGURE 2 wherein the components of the ballast apparatus 10 as shown therein are identified by the same reference numerals.

The voltage transforming and current limiting functions of the ballast apparatus 10 of the illustrative embodiment of my invention are carried out by a shell type of high reactance transformer 12 having an elongated magnetic core 13. Magnetic core 13 has a T-shaped center winding leg 14 on which the coil assemblies 15, 16 and 17 are disposed in the window space provided between the center winding leg 14 and a pair of L-shaped outer yoke legs 18, 19. As is a common practice in the art, the center winding leg 14 and the outer yoke legs 18, 19 are formed of stacks of laminations of electrical steel and are held in assembled relation by core clamps 20, 21.

In the high reactance transformer 12 used in the exemplification of the invention, the leakage reactance required for limiting current is essentially provided by the distributed leakage of magnetic flux between the elongated center winding leg 14 and the nonlinear shunts 22 and 23. The function of the nonlinear shunts is more fully described and claimed in U.S. Patent No. 3,010,050 to Roger E. Hume et al.

On top of the coil assemblies 15, 16 and 17 as shown in FIGURE 1, I have placed the reference letters to indicate the windings that are respecttively included in the coil assemblies 15, 16 and 17. Cathode heating windings $H_1$ and $H_3$ are wound over primary winding $P_1$. Coil assembly 16, which is located between coil assemblies 15 and 17, contains the secondary winding S while coil assembly 17 contains a secondary primary winding $P_2$ and cathode heating winding $H_2$.

In the illustrated exemplification of the invention, I have located a saturable reactor 25 in an insulator 9 between the high reactance transformer 12 and a three terminal capacitor container housing a series capacitor $C_1$ and shunting capacitor $C_4$. As will be hereinafter more fully explained, the saturable reactor 25 performs the voltage dropping function in accordance with the invention. To discharge the series capacitor $C_1$ and the starting capacitor $C_2$ when the ballast apparatus 10 is deenergized, bleeder resistors $R_1$ and $R_2$ are provided. A radio interference capacitor $C_3$ and a starting capacitor $C_2$ are located alongside of the coil assembly 16 on the magnetic core 13.

Having reference to the schematic circuit diagram shown in FIGURE 2, the electrical connections of the ballast apparatus 10 embodying one form of my invention will now be more fully described. It will be noted that I have also shown in the schematic circuit diagram of FIGURE 2, the external electrical connections of the ballast apparatus 10 to a pair of fluorescent lamps 1 and 2. Lamps 1 and 2 are disposed in close proximity to a grounded conductive part or fixture 9 to aid in starting the lamps 1, 2. In order to energize the ballast apparatus 10, a pair of input terminal leads 26, 27 are brought out of the ballast case 11 for connection to a suitable alternating power supply (not shown), such as a 60 cycle, 115 volt commercial supply.

The output of the ballast apparatus 10 is supplied to the lamps 1 and 2 by three pairs of output leads 28, 29, 30, 31, 32 and 33. The voltages required to start and operate the lamps 1 and 2 are applied across the lamps essentially by output leads 28, 30 and 33. The voltage induced in cathode heating winding $H_1$ during starting and operation is applied across lamp electrode 34 of lamp 2. The output leads 30, 31 which are connected in circuit with cathode heating winding $H_2$ apply the voltage induced therein across electrodes 35 and 36 of lamps 1 and 2 while output leads 32, 33 perform a similar function for lamp electrode 37.

To provide the step-up in voltage required to start and operate a pair of high output fluorescent lamps in series, the ballast transformer 12 is employed. The secondary winding S is inductively coupled with primary windings $P_1$ and $P_2$ on magnetic core 13 to provide a step-up in the voltage across output leads 28, 33 as compared with the supply voltage impressed across input terminal leads 26, 27.

Since primary windings $P_1$ and $P_2$ and secondary winding S are disposed side by side on an elongated center winding leg of the magnetic core 12, there is a certain amount of leakage reactance which results from this physical arrangement. As is known in the art, additional leakage reactance may be provided by including high reluctance flux leakage paths or shunts 22, 23 between the primary windings $P_1$, $P_2$ and the secondary winding S. It will be understood that suitable flux leakage paths may be formed either through non-magnetic material such as air or through magnetic material.

In the illustrative embodiment of the invention, the high reactance transformer 12 was preferably operated with a leading current flowing through the secondary winding S. To accomplish this end a series capacitor $C_1$ was connected in series circuit relation with the secondary winding S to provide a net capacitive reactance in the secondary circuit. Starting of the lamps 1 and 2 in series is effected in the usual manner by providing a starting capacitor $C_2$ connected in shunt across lamp 2 so that the open circuit starting voltage is initially applied across lamp 1, which is the first lamp to be ignited.

In FIGURE 2, capacitor discharge resistors $R_1$, $R_2$ are shown connected in shunt with series capacitor $C_1$ and starting capacitor $C_2$ respectively, and provide a path for the discharge of these capacitors when the ballast apparatus 10 is deenergized. If desired, a radio interference capacitor $C_3$ may be connected across the input terminal leads 26 and 27 or across the lamps 1 and 2.

In FIGURE 2, I have illustrated a circuit arrangement of one form of my invention utilizing a tuned shunting capacitor $C_4$. It will be apparent that the advantages of the present invention can be realized with the benefits resulting from the use of a shunting capacitor $C_4$ tuned with the secondary winding S to provide an open circuit voltage containing substantially seventh harmonic components.

According to the invention, a saturable reactor 25 is connected in circuit with the primary windings $P_1$, $P_2$ to perform a voltage dropping function at a preselected interval in each half cycle. The saturable reactor 25 has a predetermined unsaturated impedance sufficient to cause the applied voltage to drop and thereby also cause the secondary turns ratio voltage to decrease at a point in each half cycle when the magnetizing current is sharply rising. It was found that this results in a depeaking of the waveform of the magnetizing current and also of the waveform of the current supplied by the ballast apparatus 10 to lamps 1 and 2.

Preferably, shunting capacitor $C_4$ is tuned with the secondary winding S to provide an open circuit voltage essentially at the seventh harmonic frequency or 420 cycles per second.

In FIGURE 3, I have illustrated the saturable reactor 25 used in the illustrated embodiment of the invention. The saturable reactor 25 includes a coil 41 and a core 40 formed of butted E laminations and held in assembled relation by a wedge 8. It will be appreciated that other types of reactors and voltage dropping devices, such as nonlinear resistors, may be employed in the practice of my invention. The requirement that the voltage dropping device provide a predetermined amount of unsaturated impedance to cause the peak in the current supplied by the ballast apparatus 10 to be flattened, imposes limits on the design of the saturable reactor 25. The suitability of a particular saturable reactor can be readily ascertained by inserting a suitable saturable reactor or other voltage dropping device in the primary circuit of the ballast transformer and observing the lamp current waveform on a cathode ray oscilloscope. In the exemplification of this invention having specific components to be hereinafter more fully described, I found that a saturable reactor having an unsaturated impedance between 10 and 300 ohms at supply frequency and saturating between 6 and 18 volts provided improved results in accordance with the invention.

In FIGURE 4, I have schematically illustrated a ballast apparatus 45 incorporating the voltage dropping arrangement in accordance with the invention. All of the components of the ballast apparatus 45, which are usually encased, are shown enclosed in a dashed rectangle. The dashed rectangle schematically represents an encasing means, such as a ballast case 46, or an encapsulant where components are not housed in a ballast case. Additionally, I show the ballast apparatus 45 with the external electrical leads required to make the necessary connections with a pair of lamps 1, 2 so that the lamps 1, 2 can be started and operated in series. It will be seen that electrical leads 47, 48, 49, 50, 51 and 52 are brought externally from the ballast case 46 to supply the output current of the ballast apparatus 45 to lamps 1 and 2. Lamps 1 and 2 are shown disposed in proximity to a grounded conductive plate 53, usually the lamp fixture, to provide for capacitive coupling between the lamps 1, 2 and the conductive plate 53 in order to aid in starting the lamps.

Although the illustrated embodiments of the invention are shown and described in ballast apparatus for starting and operating two discharge lamps, it will be understood that the voltage dropping arrangement of the present invention is generally applicable to ballast apparatus for operating one or more lamps.

In contrast with the embodiment of the invention shown in FIGURE 2, the ballast apparatus 45 does not include a shunting capacitor and employs a high reactance transformer having a single primary winding P. The voltage transforming and current limiting functions of the ballast apparatus 45 are carried out by the high reactance transformer 54. It includes the primary winding P and a secondary winding S which are loosely coupled on a magnetic core 55. A shunt is interposed between the primary winding P and the secondary winding S to provide a path for leakage flux. It will be understood, of course, that the flux leakage path, if desired, may be formed either by nonmagnetic material such as air or by shunts 56 of magnetic material such as are shown schematically in FIGURE 4.

A pair of input terminal leads 57, 58 are brought externally of the ballast case 46 for connection to a suitable alternating current supply (not shown). When the ballast apparatus 45 is connected to an alternating power supply, the starting and operating voltages of ballast apparatus 45 are essentially applied to lamps 1 and 2 by circuit means which include the electrical leads 47, 49 and 51, the additional leads 48, 50 and 52 being required to supply cathode heating current to lamps 1 and 2. During starting, the output current of the ballast apparatus 45 is initially applied to lamp 1 by means of electrical leads 49 and 52, since starting capacitor $C_2$ effectively causes lamp 2 to be shunted until lamp 1 is ignited. After lamp 1 is started the output current of the ballast apparatus 45 is supplied to lamps 1 and 2 essentially by output leads 47 and 52 to operate the lamps in series.

Preferably, a series capacitor $C_5$ is connected in series circuit relation with the secondary winding S to provide a net capacitive reactance in the secondary circuit of transformer 54. Capacitor discharging resistors $R_3$ and $R_4$ may be connected across capacitors $C_2$ and $C_5$ to cause the capacitors to be discharged when ballast apparatus 45 is deenergized.

In accordance with the voltage dropping arrangement of my invention, I have provided a saturable reactor 59 in the series circuit with the input lead 57 and one end of the primary winding P. Saturable reactor 59 introduces a predetermined unsaturated impedance in the primary circuit of ballast transformer 54 sufficient to produce a voltage dropping action in each half cycle that prevents the output current from reaching the peak value that it would otherwise have but for the voltage dropping action.

The starting of lamps 1 and 2 by ballast apparatus 10 and 45 shown in FIGURES 2 and 4 is accomplished in a conventional manner. The open circuit voltage output of the apparatus is applied initially across lamp 1, since the starting capacitor $C_2$ effectively shunts lamp 2. Starting of lamp 1 is aided by a small auxiliary current flow between a lamp electrode and the conductive fixture disposed in capacitive relationship with lamp 1. After the first lamp 1 has started, the voltage across the starting capacitor $C_2$ is sufficient to start lamp 2. Once both lamps 1 and 2 have started, the starting capacitor $C_2$ has sufficient impedance as compared with the lamp impedance so that the current through the starting capacitor $C_2$ is negligibly small during operation.

Figure 5:
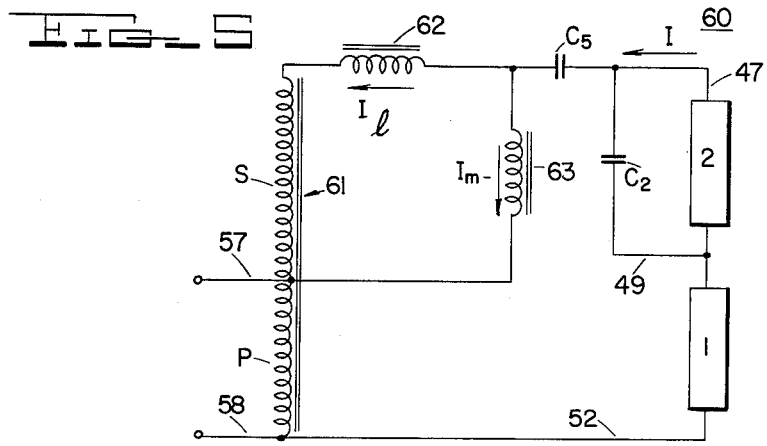
FIGURE 5 shows an equivalent circuit diagram of a ballast apparatus for starting and operating a pair of serially connected lamps as shown in FIGURE 4 without the saturable reactor of the invention.

The operation of the ballast apparatus 10 and 45 of the invention shown in FIGURES 2 and 4 may be best understood by first considering the operation of the ballast apparatus 45 shown in FIGURE 4 without a voltage dropping saturable reactor 54. In FIGURE 5, I have illustrated an equivalent circuit 60 of the ballast apparatus 45 without the saturable reactor 54, the ballast transformer 54 being replaced by a simplified $\pi$-equivalent transformer circuit comprised of an ideal transformer 61, a leakage reactance element 62 connected in series circuit with secondary winding S, and a magnetizing reactance element 63. In the simplified equivalent transformer circuit the effect of core losses and the magnetizing reactance of the primary winding P may be neglected since these factors have no appreciable influence on the output current waveform where the high reactance transformer has a net capacitive reactance in the secondary as do the high reactance transformers 12 and 54 of FIGURES 2 and 4. A more complete description of the $\pi$-equivalent circuit of a transformer may be found in the textbook, "Transformer Engineering," by L. F. Blume published by John Wiley and Sons, Inc., first edition (1938), at pages 64–68.

In the equivalent ballast circuit 60 of FIGURE 5, I have identified the leakage reactance current, the magnetizing current and the output or lamp current by the reference symbols $I_l$, $I_m$ and $I$ respectively. The directions of the current flow as indicated by the arrows in the equivalent circuit diagram are arbitrarily assumed to be as shown. It will be seen that the series capacitor $C_5$ and starting capacitor $C_2$ retain a similar relative location with respect to lamps 1 and 2 as they do in the physical circuit shown schematically in FIGURE 4. The electrical leads required to connect cathode heating windings $H_1$, $H_2$ and $H_3$ have been omitted in the equivalent circuit 60. The output of the equivalent circuit 60 is applied to lamps 1, 2 by means of output leads 47, 49 and 52. Primary windings P is provided with input leads 57 and 58 for connection to the alternating current supply.

From the equivalent ballast circuit diagram 60, it will be seen that the instantaneous value of the lamp current $I$ is equal to the sum of the instantaneous values of the magnetizing current $I_m$ and the leakage current $I_l$. In FIGURE 6, I have shown a plot of the instantaneous values of the lamp current $I$, the magnetizing current $I_m$ and the leakage current $I_l$ for approximately one complete cycle. The waveform of the output current $I$ has been located with respect to the time axis so that the start of the cycle is shown at the zero point, the half cycle at the $\frac{1}{120}$ of a second point on the time axis and the complete cycle at the $\frac{1}{60}$ of a second point on the time axis. It will be observed that the waveform of the output current $I$ and the magnetizing current $I_m$ are characterized by sharp peaks which occur during the middle portion of each half cycle.

Referring to the equivalent circuit diagram of FIGURE 5 and to the waveforms of the currents $I$, $I_m$ and $I_l$ shown in FIGURE 6, I will now first describe the operation of the equivalent circuit 60. When the instantaneous values of the output current $I$ are approaching the zero point as seen in FIGURE 6, it will be seen that the output current $I$ and the leakage current $I_l$ have a decreasing negative value. However, the magnetizing current $I_m$ is positive and increasing in magnitude. Turning to the equivalent circuit dirgam of FIGURE 5, the current flow through the leakage reactance element 62, the magnetizing reactance element 63 and the lamps 1, 2 will be in the direction indicated by the arrows.

Continuing with the description of instantaneous operating condition just before the output current $I$ swings positive, the charge on the series capacitor $C_5$ is such that its right plate as viewed in FIGURE 5 is positively charged with respect to the left plate and its is approaching its maximum charge. Further, the secondary turns ratio voltage across the secondary winding S is of such polarity that the lower end of the secondary winding S is positive with respect to the upper end. The polarity of the primary voltage is such that is lower end is also positive with respect to the upper end. Thus, at the instant the lamp current $I$ reaches the zero point, instantaneous lamp voltage will be equal to the instantaneous voltage across the series capacitor $C_5$ plus the instantaneous value of the voltage across the leakage reactance element 62 minus the instantaneous value of the secondary turns ratio voltage of secondary winding S minus the instantaneous value of the primary voltage.

It will be understood that the higher the lamp voltage is at the start of each cycle the sooner the lamps 1 and 2 will start conducting in each half cycle. Ideally, it is desirable that the lamp voltage instantly rise to the desired operating level of lamps 1 and 2 or in other words that the lamp voltage waveform be substantially square in shape. In the aforementioned U.S. Patent No. 3,010,050 granted to R. E. Hume et al., there is described and claimed a ballast apparatus wherein nonlinear shunts are employed to provide an increased leakage reactance during the early portion of the cycle to cause the instantaneous lamp voltage to increase in the early portion of the half cycle. In the copending patent application to R. E. Hume Patent No. 3,225,255 there is claimed and described an arrangement wherein a capacitor and an impedance element are conected in shunt with the secondary winding to provide an oscillatory voltage just after the lamp current passes through the zero point so that spikes of current are provided to aid with reignition of the lamps 1 and 2 early in each half cycle. As will hereinafter be more fully explained, the present invention can be utilized separately on in conjunction with the aforementioned modifications to obtain further improvements in the lamp current waveform.

Referring again to the waveform of the lamp current $I$ and the magnetizing current $I_m$ shown in FIGURE 6, it will be noted that the instantaneous values first moderately increase in the positive direction at the start of the cycle and then as the cycle advances, the instantaneous values of both the lamp current $I$ and the magnetizing current $I_m$ increase sharply until their peak values are reached. After the peak values are reached, both currents $I$ and $I_m$ decrease rapidly to define a waveform having a pronounced peaked wave shape. I have found that by connecting a saturable reactor 59 in circuit with the primary winding P as shown in the embodiment of my invention illustrated in FIGURE 4, this objectionable peaked wave shape in the lamp current can be minimized. It will be noted that in FIGURE 6, I have shown approximately how the peak in the waveform of the lamp current $I$ is flattened when a ballast apparatus is operated with the voltage dropping arrangement of the invention.

From the foregoing description, it will be apparent the saturable reactor 25 as shown in FIGURE 2 and saturable reactor 59 as shown in FIGURE 4 cause the applied voltage to drop in each half cycle at a time when the magnetizing current $I$ is increasing at a rapid rate of change and approaching its maximum or peak value. The drop in the primary voltage also results in a proportional drop in the secondary turns ratio voltage. Thus, a reduction is effected in the peak lamp current.

In FIGURE 7, I have shown a waveform of one cycle of the output current $I_2$ of the ballast apparatus 10 of FIGURE 2 and the waveform of one cycle of the output current $I_3$ of a ballast apparatus of the type shown in FIGURE 4 without the saturable reactor 59. Further, by way of comparison, I have shown in FIGURE 8 the waveform of the output current $I_2$ superposed on the waveform of one cycle of the output current $I_4$ of a ballast apparatus of the type shown in FIGURE 2 without the saturable reactor.

The ballast apparatuses used to make the waveform determinations were designed to operate a pair of 96 inch power groove T-17 fluorescent lamps. The waveforms shown in FIGURES 7 and 8 represent the lamp or output current for a constant light output as observed on a cathode ray oscilloscope. In order that the waveform of the output current $I_2$ of one form of my invention may be compared with the waveforms of the output currents, $I_3$ and $I_4$, the waveform of output current $I_2$ is shown plotted to the same scale as output current $I_3$ in FIGURE 7 and to the same scale as output current $I_4$ in FIGURE 8.

Referring now more particularly to the waveforms of the output currents $I_2$ and $I_3$ shown in FIGURE 7, it will be seen from comparison of the two wave shapes that in the waveform of output current $I_2$ the peak has been very appreciably reduced by the voltage dropping action of saturable reactor 25. The peak or maximum value of the output current represented by waveform $I_2$ was approximately 2.43 amperes as compared with 1.74 amperes for waveform $I_2$.

Even where other means for improving wave shape are employed, such as a shunting capacitor $C_4$ and nonlinear shunts 22, 23 (see FIGURE 2), it will be seen from a comparison of the waveforms of the instantaneous current $I_2$ and $I_4$ as shown in FIGURE 8 that still further improvements can be achieved by the voltage dropping arrangement of the present invention. The peak value of the output current $I_4$ was approximately 2.02 amperes.

Further, by way of exemplification of the invention, the ballast apparatus 10 as shown schematically in FIGURE 2 was constructed for starting and operating a pair of 96 inch power groove lamps rated at 216 watts. The magnetic core 13 of the high reactance transformer 12 was formed of a stack of laminations having the following dimensions: 1.422 inches in height, 9.782 inches long and 2.845 inches wide. The primary windings $P_1$ and $P_2$ were wound with No. 20, .0339 of an inch in diameter, copper wire, primary winding $P_1$ having 357 turns and primary winding $P_2$ having 357 turns. Secondary winding S had 1276 turns of No. 20, .0320 of an inch in diameter, copper wire, while the heating windings $H_1$ and $H_3$ had 12 turns and heating winding $H_2$ was wound with 13 turns. The series capacitor $C_1$ had a capacitance of 9.82 microfarads, and its associated discharge resistor $R_1$ had a resistance of $2.0 \times 10^6$ ohms. The starting capacitor $C_2$ had a capacitance of .075 microfarad, and its discharge resistor $R_2$ had a resistance of $4.0 \times 10^6$ ohms. Radio interference capacitor $C_3$ provided a capacitance of .01 microfarad. The shunting capacitor $C_4$ was tuned with the secondary winding S to provide an open circuit voltage tuned essentially at the seventh harmonic frequency and had a capacitance of .370 microfarads. The saturable reactor 25 was wound with 138 turns of No. 17, .0453 of an inch in diameter, wire, the saturable reactor 25 providing an unsaturated impedance of approximately 100 ohms and saturating at about 7 to 8 volts.

In order to demonstrate the advantages which may be obtained from the voltage dropping arrangement of the present invention, a ballast apparatus 10 utilizing the components as described above was operated and tested. The root mean square, the average and peak current supplied by the apparatus 10 to the lamps 1 and 2, the crest factor, lamp power factor, and secondary transformer losses were determined. By way of comparison, I also operated and made similar determinations for a ballast apparatus as shown in FIGURE 2 but without the saturable reactor 25 and also for a ballast apparatus as shown in FIGURE 4 without the saturable reactor 59. In Table I, the results of these determinations are summarized. All current measurements were made while the lamps were operated at a fixed light output.

TABLE I

|  | The improved ballast apparatus of Figure 2 | The ballast apparatus of Figure 2 without saturable reactor 25 | The ballast apparatus of Figure 4 without saturable reactor 54 |
| --- | --- | --- | --- |
| Root mean square current | 1,275 | 1,365 | 1,445 |
| Average current in amperes | 1.18 | 1.235 | 1.24 |
| Peak current in amperes | 1.74 | 2.42 / 2.02 | 2.43 |
| Crest factor (ratio of peak current to RMS current) | 1.362 | 1.77 | 1.68 |
| Lamp power factor | .925 | .891 | .788 |
| Secondary $I^2R$ loss (watts) | 11.2 | 12.9 | 17.8 |

It will be noted from the data presented in Table I that the root mean square, the average and peak values of the current supplied by the apparatus to the lamps are significantly reduced as compared with the two other comparable ballast apparatuses. One of the principal advantages resulting from the improved output current waveform is that savings can be realized in the copper and core steel used in the construction of the ballast transformer. Two values for the peak current, 2.42 and 2.02 amperes, are given for the ballast apparatus of FIGURE 2 without the saturable reactor 25, since the peak current for one half cycle was found to be 2.42 amperes and for the subsequent half cycle it was 2.02 amperes.

Although in the illustrative embodiments of the invention a saturable reactor is used, it will be appreciated that other voltage dropping elements such as a nonlinear resistor may be used to produce the voltage drop required in each half cycle to prevent a sharp peak from occurring in the output current waveform.

It will be apparent that the specific ballast apparatus which I have described herein may be changed substantially without departing from the principle of the invention. While this invention has been explained by describing a preferred embodiment thereof, it will be apparent that many modifications may be made without departing from the spirit of the invention, and, therefore, it is intended to cover all such equivalent variations within the scope of the appended claims.

What I claim as new and desire to secure by Letters Patent of the United States is:

1. A ballast apparatus for starting and operating at least one gaseous discharge lamp comprising a ballast transformer having at least one primary winding and secondary winding inductively coupled on a magnetic core, a shunting capacitor connected in parallel circuit relation with said secondary winding and tuned with said secondary winding at substantially the seventh harmonic frequency, circuit means including a plurality of electrical leads connected in circuit with said ballast transformer for supplying the output current of the apparatus to at least one gaseous discharge lamp connected in circuit therewith, and a voltage dropping element connected in circuit with the primary winding of said ballast transformer, said voltage dropping element providing a voltage drop to cause the rate of change of the magnetizing current of said ballast transformer to decrease as said magnetizing current approaches its maximum value in each half cycle thereby preventing a substantially peaked wave shape from occurring in each half cycle of the waveform of the output current supplied by the ballast apparatus during operation.

2. A ballast apparatus for starting and operating at least a pair of fluorescent lamps from an alternating power supply comprising: a high reactance transformer having a primary winding and a secondary winding inductively coupled therewith on an elongated magnetic core, a pair of input leads for connection to said alternating power supply, said primary winding of said high reactance transformer being connected across said input leads, circuit means including a starting capacitor and electrical leads for connecting said starting capacitor in shunt across one of said pair of lamps and including a plurality of leads connected in circuit with said transformer and starting capacitor for supplying the output current of said apparatus to said lamps connected in circuit therewith, and a voltage dropping element connected in circuit with said primary winding, said voltage dropping element having a predetermined impedance sufficient to provide a voltage drop in each half cycle of the alternating supply to prevent a substantially peaked wave shape from occurring in each half cycle of the waveform of the output current supplied by the apparatus.

3. The ballast apparatus as set forth in claim 2 wherein a series capacitor is connected in series circuit relation with the secondary winding, said series capacitor providing a net capacitive reactance in the secondary circuit of said ballast transformer.

4. A ballast apparatus for starting and operating at least one fluorescent lamp from an alternating power supply comprising: a ballast transformer having at least one primary winding and at least one secondary winding inductively coupled therewith on a magnetic core, a pair of input leads for connection to said alternating power supply, said primary winding of said ballast transformer being connected across said input leads, a shunting capacitor connected in parallel circuit relation with said secondary winding and tuned with said seconding winding at substantially the seventh harmonic frequency, circuit means including a plurality of output leads for supplying the output of said ballast transformer to said fluorescent lamp, and a saturable reactor connected in series circuit relation with said primary winding and in circuit with one of said input leads, said saturable reactor having a predetermined unsaturated impedance, and said unsaturated impedance producing a voltage drop in each half cycle of the alternating supply to prevent a substantially peaked wave shape from occurring in each half cycle of the waveform of the current supplied during operation to the fluorescent lamp.

5. A ballast apparatus for starting and operating a pair of fluorescent lamps from an alternating power supply comprising: a high reactance transformer having at least one primary winding and at least one secondary winding inductively coupled with said primary winding on an elongated magnetic core, a pair of input terminal leads for connection with the alternating power supply, said primary winding being connected across said input terminal leads, a series capacitor connected in series circuit relation with the secondary winding to provide a net capacitive reactance in the secondary circuit of said high reactance transformer, circuit means including a starting capacitor and a plurality of electrical leads for connecting said starting capacitor in shunt with one of said pair of fluorescent lamps and for connecting at least said secondary winding of said high reactance transformer and said series capacitor in circuit with said lamp, and a saturable reactor connected in series relation with said primary winding, said saturable reactor having a predetermined unsaturated impedance, and said saturable reactor providing during operation a voltage drop in the early portion of each half cycle of the alternating power supply to prevent a substantially peaked wave shape from occurring in each half cycle of the waveform of the current supplied by the apparatus to the pair of fluorescent lamps.

6. The ballast apparatus as set forth in claim 5 wherein one end of said saturable reactor is connected in circuit with one of said input terminal leads and at the other end thereof is connected in circuit with said primary winding of said high reactance transformer.

7. A ballast apparatus for starting and operating at least one fluorescent lamp from an alternating current supply comprising: a ballast transformer having a primary winding and a secondary winding inductively coupled therewith on a magnetic core, a pair of input leads connected in circuit with the opposite ends of the primary winding and being adapted for connection to the alternating current supply, circuit means including a plurality of output leads for supplying the output current of the apparatus to said fluorescent lamp and for connecting at least said secondary winding in circuit with said fluorescent lamp, a shunting capacitor connected in parallel circuit relation with said secondary winding, said shunting capacitor being tuned with said secondary winding at substantially the seventh harmonic frequency, said shunting capacitor discharging in the early portion of each half cycle to provide spikes of current to aid reignition early in each half cycle of a lamp connected in circuit with said output leads, a voltage dropping element connected in circuit with said primary winding and in the discharge path of said shunting capacitor, said voltage dropping element having a predetermined impedance, said impedance being sufficient to cause a voltage drop in the early portion of each half cycle of the alternating supply and prevent a substantially peaked wave shape from occurring in the current supplied to the lamp.

8. A ballast apparatus for starting and operating a pair of serially connected fluorescent lamps from an alternating current supply comprising a high reactance ballast transformer having a primary and a secondary winding inductively coupled therewith on a magnetic core, a series capacitor connected in series circuit relation with the secondary winding of said transformer and providing a net capacitive reactance in the secondary circuit thereof, a shunting capacitor connected in parallel circuit relation with the secondary winding of said high reactance transformer, said shunting capacitor being tuned with said secondary winding to provide an open circuit voltage containing substantially seventh harmonic components, circuit means including a plurality of electrical leads for supplying the output current of the apparatus to the pair of fluorescent lamps, and a saturable reactor connected in circuit with the shunting capacitor and in circuit with the primary winding, said saturating reactor having a predetermined unsaturated impedance, and said unsaturated impedance providing a voltage drop in the early portion of each half cycle to prevent a substantially peaked wave shape from occurring in the waveform of the current supplied to the pair of fluorescent lamps.

9. The ballast apparatus set forth in claim 8 wherein one end of said saturable reactor is connected in circuit with one of said input leads and said shunting capacitor, the other end of said saturable reactor being connected in circuit with said primary winding.

10. A ballast apparatus for starting and operating at least one gaseous discharge lamp comprising a ballast transformer having at least one primary winding and secondary winding inductively coupled on a magnetic core, a series capacitor connected in series circuit relation with the secondary winding, said series capacitor providing a net capacitive reactance in the secondary circuit of said ballast transformer, circuit means including a plurality of electrical leads connected in circuit with said ballast transformer for supplying the output current of the apparatus to at least one gaseous discharge lamp connected in circuit therewith, and a voltage dropping element connected in circuit with said ballast transformer, said voltage dropping element providing a voltage drop to cause the rate of change of the magnetizing current of said ballast transformer to decrease as said magnetizing current approaches its maximum value in each half cycle thereby preventing a substantially peaked wave shape from occurring in each half cycle of the waveform of the output current supplied by the ballast apparatus during operation.

11. A ballast apparatus for starting and operating at least one fluorescent lamp from an alternating power supply comprising: a ballast transformer having at least one primary winding and at least one secondary winding inductively coupled therewith at a magnetic core, a pair of input leads for connection to said alternating power supply, said primary winding of said ballast transformer being connected across said input leads, a series capacitor connected in series circuit relation with said secondary winding, circuit means including a plurality of output leads for supplying the output of said ballast transformer to said fluorescent lamp, and a saturable reactor connected in series circuit relation with said primary winding and in circuit with one of said input leads, said saturable reactor having a predetermined unsaturated impedance, and said unsaturated impedance producing a voltage drop in each half cycle of the alternating supply to prevent a substantially peaked wave shape from occurring in each half cycle of the waveform of the current supplied during operation to the fluorescent lamp.

References Cited by the Examiner
FOREIGN PATENTS 65,408 2/1956 France.
691,902 5/1953 Great Britain.

GEORGE N. WESTBY, *Primary Examiner.*

C. R. CAMPBELL, *Assistant Examiner.*